(12) United States Patent
Benayon et al.

(10) Patent No.: US 9,785,899 B2
(45) Date of Patent: Oct. 10, 2017

(54) CONFIGURABLE RESOURCE POLICIES

(71) Applicant: INTERNATIONAL BUSINESS MACHINES CORPORATION, Armonk, NY (US)

(72) Inventors: Jay W. Benayon, Thornhill (CA); Vincent Szaloky, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 499 days.

(21) Appl. No.: 13/893,941

(22) Filed: May 14, 2013

(65) Prior Publication Data

US 2013/0339079 A1 Dec. 19, 2013

(30) Foreign Application Priority Data

Jun. 15, 2012 (CA) ........................................ 2779993

(51) Int. Cl.
*G06Q 10/00* (2012.01)
*G06Q 10/06* (2012.01)
*G06F 9/50* (2006.01)

(52) U.S. Cl.
CPC ..... *G06Q 10/06315* (2013.01); *G06F 9/5083* (2013.01); *G06Q 10/06* (2013.01)

(58) Field of Classification Search
CPC ................ G06F 21/6218; G06Q 10/06; G06Q 10/06315; G06Q 10/0633
USPC ....................................................... 705/7.12
See application file for complete search history.

(56) References Cited

U.S. PATENT DOCUMENTS

| | | | |
|---|---|---|---|
| 4,430,699 A * | 2/1984 | Segarra et al. | 709/230 |
| 2007/0288212 A1 | 12/2007 | Messmer et al. | |
| 2009/0327908 A1 * | 12/2009 | Hayton | 715/744 |
| 2009/0327909 A1 * | 12/2009 | Hayton | 715/744 |
| 2010/0179847 A1 | 7/2010 | Cope et al. | |
| 2010/0262559 A1 | 10/2010 | Wilcock et al. | |

FOREIGN PATENT DOCUMENTS

| EP | 1092213 B1 | 9/2003 |
|---|---|---|
| JP | 2008217443 | 9/2008 |

OTHER PUBLICATIONS

Tjoa, S., et al. "A Formal Approach Enabling Risk-Aware Business Process Modeling and Simulation", IEEE Transactions on Services Computing, vol. 4, No. 2, Apr.-Jun. 2011, pp. 153-166.
Tjoa, S., et al., "Planning Dynamic Activity and Resource Allocations Using a Risk-Aware Business Process Management Approach", International Conference on Availability, Reliability, and Security, IEEE, 2010, pp. 268-274.

* cited by examiner

Primary Examiner — Johnna Loftis
(74) Attorney, Agent, or Firm — Law Office of Jim Boice (57) ABSTRACT

A computer-implemented process for managing configurable resource policies executes a resource expression associated with a received user selection to extract information from an executing simulation. Responsive to a determination that there are no more user selections to process, a set of rules is selected using the user selections and resource expression to populate a resource template using extracted information and selected rules. A resource policy is generated using the populated template. The generated resource policy is applied to the executing simulation, wherein behavior of the executing simulation is modified.

11 Claims, 4 Drawing Sheets

Policy system 300

CONFIGURABLE RESOURCE POLICIES

BACKGROUND

This disclosure relates generally to rule processing in a data processing system and more specifically to configurable resource policies for business process simulation in the data processing system.

One of the primary reasons for simulating a business process is to monitor and optimize resource utilization within the process. Nevertheless, typical business processes and simulation tools provide only limited (if any) support for resource policies. To model real world processes typically requires the ability to model flexible and dynamic resource policies, which control availability and applicability of the resources.

In an example of previous solutions, focus is on simulation configuration parameters (for example, inputs) used to drive a simulation and not the resources of the simulation. In the example of the previous solution the running simulation of the process is also monitored. A rules database defines rules, for driving the simulation, using the simulation configuration parameters.

Another example of previous solutions simulation of software deployed on information technology infrastructure and optimizing a configuration of the deployment is a focus. Templates described using this solution are used only for model generation. Another example discusses dynamic resource allocation and resource re-allocation specifying interdependent relationships.

SUMMARY

According to one embodiment, a computer-implemented process for managing configurable resource policies receives a user selection, executes a resource expression associated with the received user selection to extract information from an executing simulation and determines whether there are more user selections to process. Responsive to a determination that there are no more user selections to process, a set of rules is selected using the user selections and resource expression. A resource template is populated using extracted information and selected rules and a resource policy is generated using the populated template. The resource policy is applied to the executing simulation, wherein behavior of the executing simulation is modified.

According to another embodiment, a computer program product for managing configurable resource policies comprises a computer recordable-type storage media containing computer executable program code stored thereon. The computer executable program code comprises computer executable program code for receiving a user selection, computer executable program code for executing a resource expression associated with the received user selection to extract information from an executing simulation, computer executable program code for determining whether there are more user selections to process, computer executable program code responsive to a determination that there are no more user selections to process, for selecting a set of rules using the user selections and resource expression, computer executable program code for populating a resource template using extracted information and selected rules and computer executable program code for generating a resource policy using the populated template.

According to another embodiment, an apparatus for managing configurable resource policies comprises a communications fabric, a memory connected to the communications fabric, wherein the memory contains computer executable program code, a communications unit connected to the communications fabric, an input/output unit connected to the communications fabric, a display connected to the communications fabric and a processor unit connected to the communications fabric. The processor unit executes the computer executable program code to direct the apparatus to receive a user selection, execute a resource expression associated with the received user selection to extract information from an executing simulation, determine whether there are more user selections to process and responsive to a determination that there are no more user selections to process, select a set of rules using the user selections and resource expression. The processor unit executes the computer executable program code to direct the apparatus to populate a resource template using extracted information and selected rules, generate a resource policy using the populated template and apply the generated resource policy to the executing simulation, wherein a behavior of the executing simulation is modified.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present invention may take the form of a computer program product embodied in one or more computer readable medium(s) having computer readable program code embodied thereon.

Any combination of one or more computer-readable data storage medium(s) may be utilized. A computer-readable data storage medium may be, for example, but not limited to, an electronic, magnetic, optical, or semiconductor system, apparatus, or device, or any suitable combination of the foregoing. More specific examples (a non-exhaustive list) of the computer-readable data storage medium would include the following: a portable computer diskette, a hard disk, a random access memory (RAM), a read-only memory (ROM), an erasable programmable read-only memory (EPROM or Flash memory), a portable compact disc read-only memory (CDROM), an optical storage device, or a magnetic storage device or any suitable combination of the foregoing. In the context of this document, a computer-readable data storage medium may be any tangible medium that can contain, or store a program for use by or in connection with an instruction execution system, apparatus, or device.

A computer-readable signal medium may include a propagated data signal with the computer-readable program code embodied therein, for example, either in baseband or as part of a carrier wave. Such a propagated signal may take a variety of forms, including but not limited to electro-magnetic, optical or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer-readable medium may be transmitted using any appropriate medium, including but not limited to wireless, wire line, optical fiber cable, RF, etc. or any suitable combination of the foregoing.

Computer program code for carrying out operations for aspects of the present disclosure may be written in any combination of one or more programming languages, including an object oriented programming language such as Java®, Smalltalk, C++, or the like and conventional procedural programming languages, such as the "C" programming language or similar programming languages. Java and all Java-based trademarks and logos are trademarks of Oracle, and/or its affiliates, in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus, (systems), and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer or other programmable data processing apparatus to function in a particular manner, such that the instructions stored in the computer readable medium produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Figure 1:
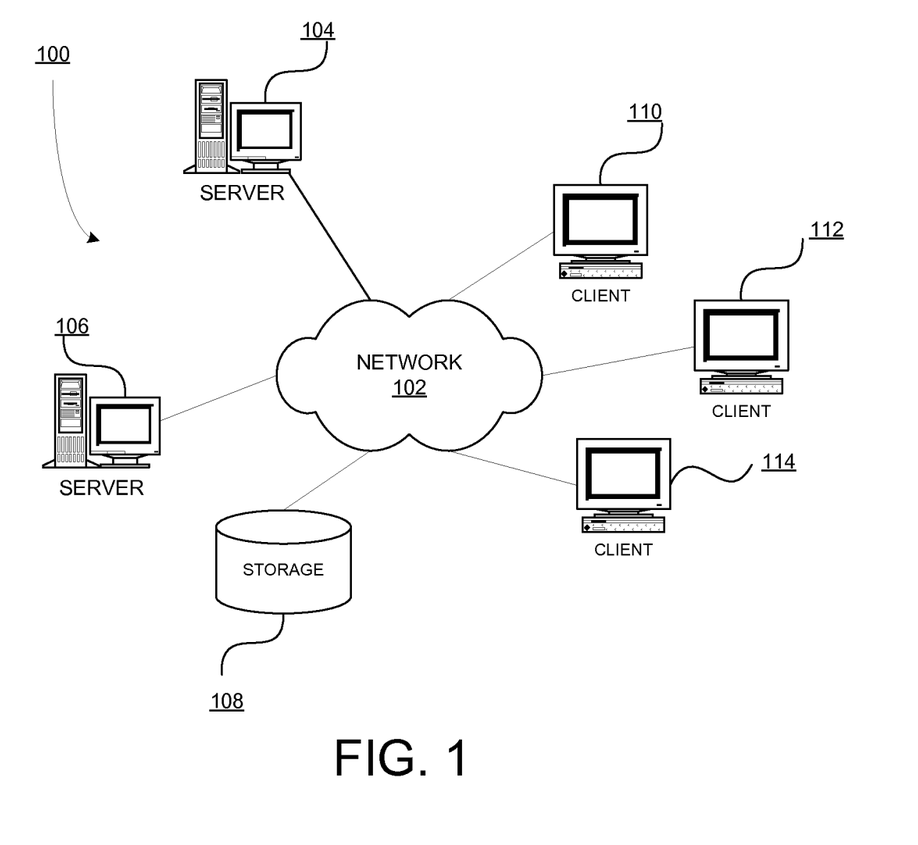
FIG. 1 is a block diagram of an exemplary network data processing system operable for various embodiments of the disclosure.
Figure 2:
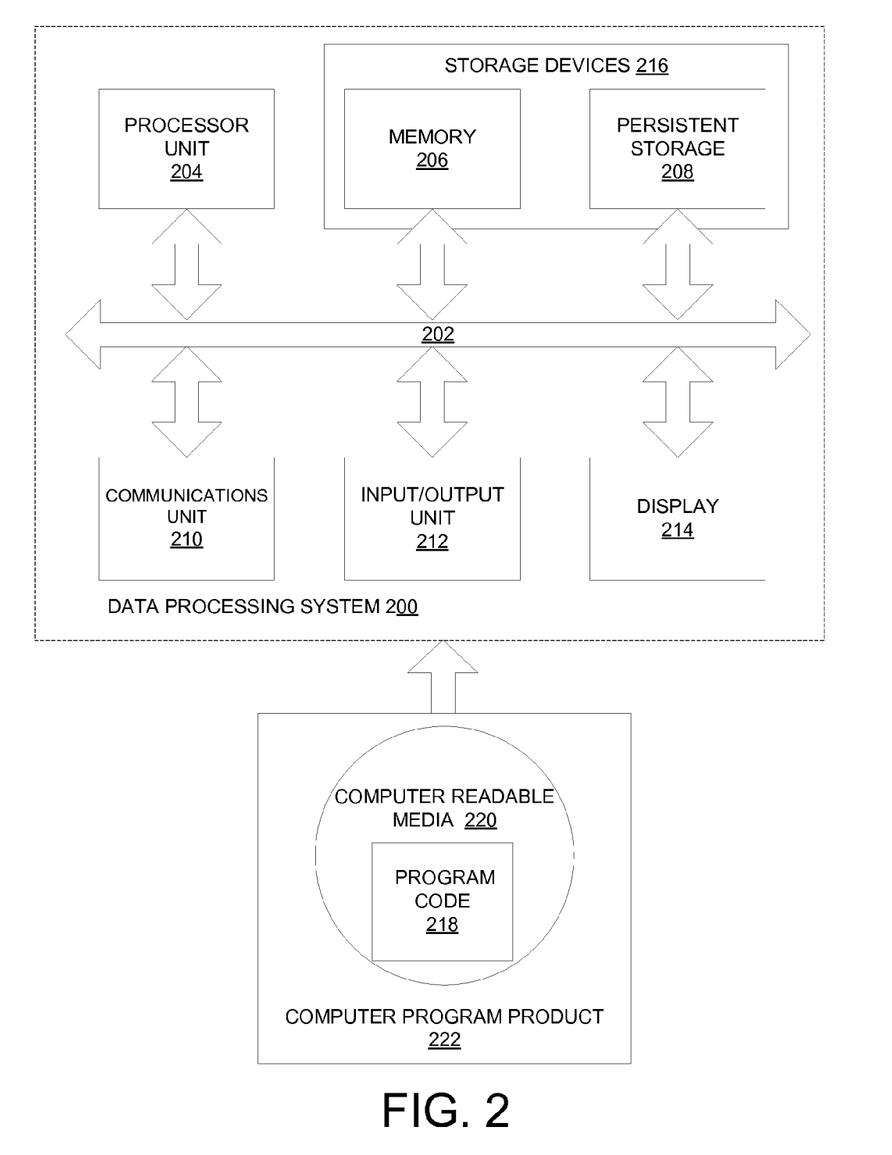
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for managing configurable resource policies is presented. Processor unit 204 executes a resource expression associated with a received user selection, using communications unit 210, input/output unit 212 or storage devices 216 to extract information from an executing simulation. Responsive to a determination that there are no more user selections to process, processor unit 204 selects a set of rules using the user selections and resource expression to populate a resource template in storage devices 216, such as memory 206 or persistent storage 208, using extracted information and selected rules. Processor unit 204 using the populated template generates a resource policy. Processor unit 204 applies the generated resource policy to the executing simulation, wherein behavior of the executing simulation is modified.

Using an embodiment of the disclosed process for configurable resource policies for business process simulation enables a modeler to create a custom resource policy for a specific business process. Creation of a customized resource policy is achieved using a combination of resource policy templates and user defined expressions to control resource allocation, de-allocation and availability. An embodiment of the disclosed process typically adds flexibility to a resource model to enable closer alignment with real world usage.

An embodiment of the disclosed process for configurable resource policies for business process simulation comprises resources annotated with data including expressions describing the resource, comprises, for at least one resource, obtaining an annotation with data describing the resource and evaluating at least one expression of the data describing the resource. The process further directs the simulation to reflect a characteristic of the resource responsive to the at least one evaluated expression.

Figure 3:
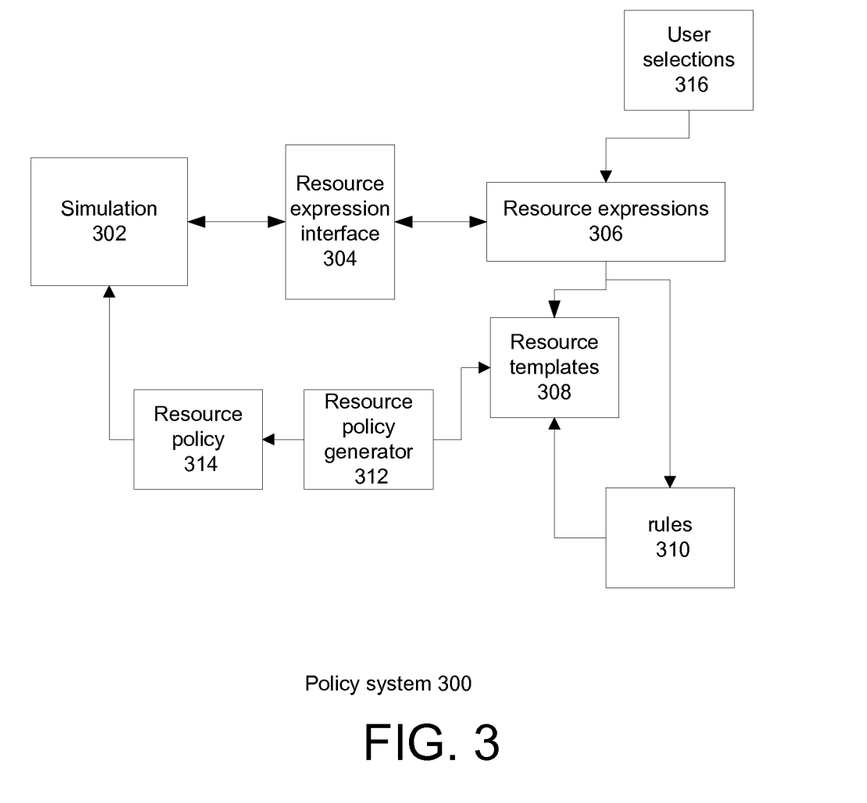
FIG. 3 is a block diagram of a policy system operable for various embodiments of the disclosure.

With reference to FIG. 3 a block diagram of a policy system operable for various embodiments of the disclosure is presented. Policy system 300 is an example of a configurable resource policy system operable for various embodiments of the disclosure.

Policy system 300 includes a number of components leveraging support of an underlying data processing system, for example network data processing system 100 of FIG. 1 or data processing system 200 of FIG. 2. The combination of components in the associated figure is an example of an embodiment in a representation of the functional components of policy system 300. In other embodiments the functional components may be combined into other blocks or a single block without departing from the function provided. In the context of the following example embodiments, a set refers to one or more elements.

Policy system 300 provides a set of data structures, and processes to form a mechanism in which resource policies are generated by resource policy generator 312 using a set of resource templates 308 defining reusable templates containing one or more rules 310 of resource allocation and de-allocation and hierarchic application of the resource templates, for example, to individual tasks, sub-process or to a process as a whole.

Traditionally, modeling resources consists of defining resources by types (or roles) and specifying attributes associated with the resource (including: quantity, unit cost or rate, location, and others) and attaching resource requirements to individual tasks within a process. In addition, creating availability timetables for resources and possibly associating different costs or rates with different availability times typically provide flexibility. Availability can also be governed by locations (associated with resources and tasks). However, the traditional means does not provide for a general resource policy.

Resource requirements of tasks are associated with policy templates and/or resource requirement expressions in embodiments of the disclosed process using policy system 300.

Simulation 302 provides a capability of executing a business process in a simulation mode. Execution of the business process in a simulation environment provides a capability to test functions and retrieve information on the runtime behavior of business processes. Simulation 302 responds to input from resource policy 314 and provides output to resource expressions 306 using resource expression interface 304.

Resource templates 308 are a set of data structures specifying sets of rules for resource usage applicable to elements within simulation 302. A resource template can be associated with several levels within a process hierarchy, including the process level, defining global rules for resource usage; the task level, defining rules for overriding the process rules for a given task; the resource requirement level, overriding the rules for the task at the level of an individual resource requirement and the resource level, defining the rules from the resource perspective. A particular implementation is left to resolve conflicts between hierarchical levels (1-3) and (4).

Each of resource templates 308 consists of a set of rules 310 governing how resources are allocated and de-allocated. Rules 310 includes a set of rules comprising one of a sequential or a random look-up of matching resources from a resource pool; a re-use strategy, in which re-use of a resource is based on a most-recently-used, a most-frequently-used, or other predefined re-use method; a cost & quantity defining whether one of a fixed quantity, maximum quantity affordable or maximum quantity available is used; an affinity providing a definition of how to allocate resources to a group of tasks (not just to individual tasks); a priority, assigned to tasks used to determine which task has precedence in the event of simultaneous requests; and atomicity, defining whether to allow or deny preemption of resources allocated to a task in the event of higher priority task requirements.

Typically, no predefined set of rules can accommodate all possible scenarios. Resource policy 314 is extensible, through association with resource expressions 306 which can dynamically calculate (during simulation time) rules 310 to be utilized. Resource expressions 306 can also be used to determine the resource requirement at run-time (thus allowing a task to determine respective resource requirements using existing conditions at a point during simulation, (for example, elapsed time of simulation, affordability of resources).

Resource requirement parameters determined by resource expressions 306 include parameters comprising types (or identities) of the resources required, an absolute quantity or maximum available quantity or maximum affordable quantity, time constraints specifying a resource must be available within a given time interval and static allocation or dynamic generation of resources is to be used.

Resource expressions 306 can be specified in an appropriate programming language with the just defined features specified as application programming interface (API) calls within the chosen programming language. The API calls are made with parameters indicating user selections 316. User selections 316 provide an indication of which resource expressions, resource templates and rules to use as an initial set for processing. Executing resource expressions 306 using resource expression interface 304 extracts information from the executing simulation 302 in the form of parameter values representing real time values for the respective parameters. The extracted values are used to populate corresponding positions within a respective template of resource templates 308. Resource expressions may be used individually or in combination to obtain parameter values from simulation 302.

Embodiments of the expression framework of policy system 300 thus provide a simulation context in which resource expressions 306 reference attributes of simulation 302 including key performance indicators of elapsed simulation time, current statistics (costs, revenues, failures), the current task, and other attributes as needed by the business process model. A key performance indicator (KPI) refers to a type of performance measurement. Key performance indicators are commonly used by an enterprise to evaluate success in an area of importance or of the business as a whole. Key performance indicators accordingly define a set of measurable values. For example, a key performance indicator for a sales department may include a number of new customers acquired in a period of time. In another example, a key performance indicator for another department may be defined in terms of inventory on hand or inventory turnover. The key performance indicator is defined, and then results attained are measured against the defined value to determine whether or to what extent objectives or targets are met.

Resource policy generator 312 packages the parameters and associated values in a data structure suitable for directing operation of simulation 314. Content of resource policy 314 causes the behavior of simulation 302 to be modified dynamically in a controlled repeatable manner in accordance with the parameters and values associated with the respective parameters contained within.

Figure 4:
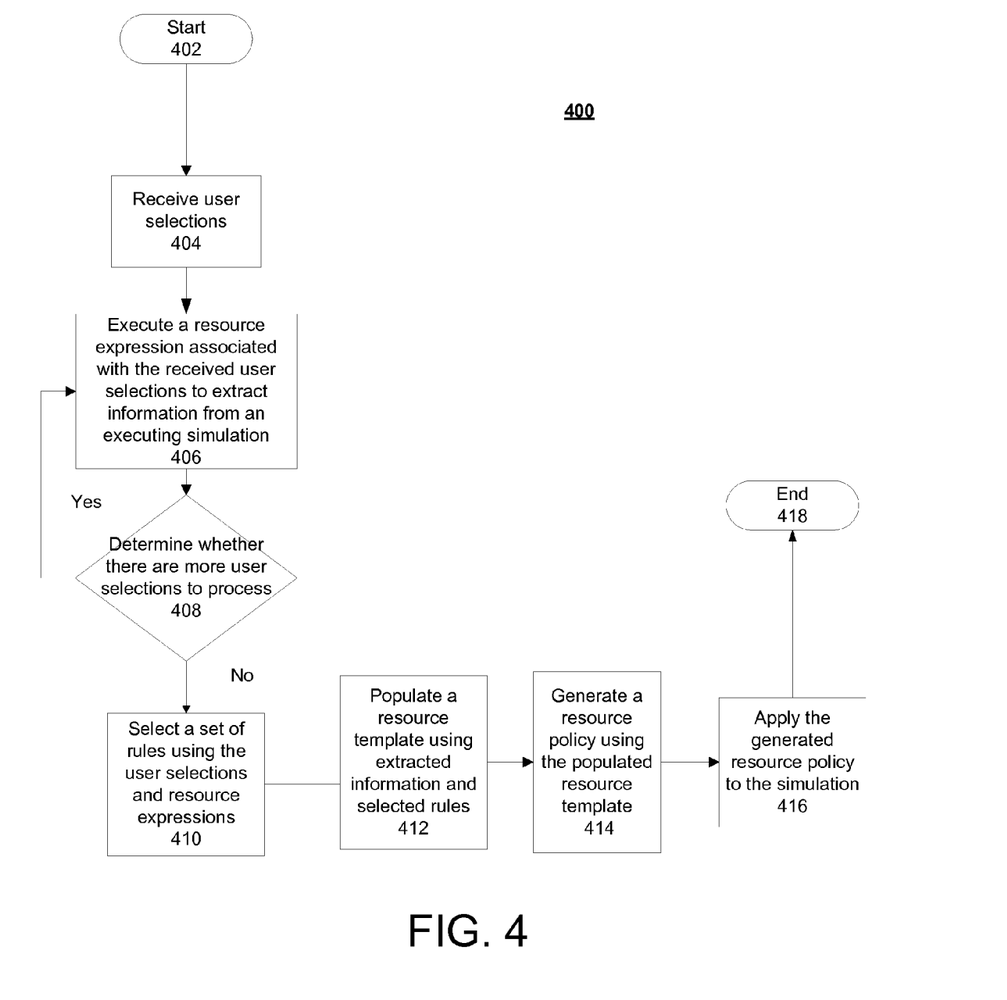
FIG. 4 is a flowchart of a policy system process in accordance with one embodiment of the disclosure.

With reference to FIG. 4 a flowchart of a policy system process operable for various embodiments of the disclosure is presented. Policy system process 400 is an example of using the configurable resource policy system 300 of FIG. 3.

Policy system process 400 begins (step 402) and receives user selections (step 404). User selections specify a set of directives comprising one or more each of resource expressions, resource templates and rules to be used with a simulation instance.

Process 400 executes each one of the at least one received resource expressions in the received user selections to extract information associated with each resource expression (step 406). Process 400 determines whether there are more user selections to process (step 408). Responsive to a determination that there are more user selections to process, process 400 loops back to perform step 406 as before. Responsive to a determination that there are no more user selections to process, process 400 selects a set of rules using the user selections and resource expressions (step 410). For example, a user selection may indicate specific rules to use or the result of a resource expression may indicate a particular rule or set of rules to use.

Process 400 populates a resource template using extracted information and selected rules (step 412). Process 400 generates a resource policy using the populated resource template (step 414). Process 400 applies the generated resource policy to the simulation (step 416) and terminates thereafter (step 418).

Thus is presented in an illustrative embodiment a computer-implemented process for managing configurable resource policies. The computer-implemented process executes a resource expression associated with a received user selection to extract information from an executing simulation. Responsive to a determination that there are no more user selections to process, a set of rules is selected using the user selections and resource expression to populate a resource template using extracted information and selected rules. A resource policy is generated using the populated template. The generated resource policy is applied to the executing simulation, wherein behavior of the executing simulation is modified.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable data storage medium having computer executable instructions stored thereon in a variety of forms. Examples of computer readable data storage media include recordable-type media, such as a floppy disk, a hard disk drive, a RAM, CD-ROMs, DVD-ROMs. The computer executable instructions may take the form of coded formats that are decoded for actual use in a particular data processing system.

A data processing system suitable for storing and/or executing computer executable instructions comprising program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

What is claimed is:

1. A method for managing configurable resource policies, the method comprising:
   receiving, by one or more processors, a user selection;
   executing, by one or more processors, a resource expression associated with the received user selection to extract information from an executing simulation, wherein the executing simulation is executing in a computer system, wherein executing, by one or more processors, the resource expression associated with the received user selection to extract information from the executing simulation comprises:
   executing, by one or more processors, the resource expression to determine a resource requirement at run-time associated with a task to determine respective resource requirements using existing conditions at a current point in the executing simulation, wherein resource requirement parameters determined by the resource expressions include parameters comprising types and identities of the resources required; a quantity in a form of an absolute quantity, a maximum available quantity or a maximum affordable quantity; time constraints specifying a resource availability within a given time interval; and an allocation using one of a static allocation or a dynamic generation of resources, wherein the resource requirement parameters are specified in an application programming interface (API) call received over a network by a client from a server;

determining, by one or more processors, whether there are more user selections to process;

in response to a determination that there are no more user selections to process, selecting a set of rules using the user selections and resource expression, wherein selecting the set of rules using the user selections comprises:

selecting, by one or more processors, the set of rules from a group of rules, wherein the group of rules is matched to:

a resource pool;

a re-use strategy, in which re-use of a resource is based on a selected one of a most-recently-used, a most-frequently-used, or a user predefined re-use method;

a cost and quantity defining a selected one of a fixed quantity, a maximum quantity affordable and a maximum quantity available;

an affinity defining how to allocate resources to a group of tasks;

a priority, assigned to tasks for determining which task has precedence in the event of simultaneous requests; and atomicity defining whether to permit preemption of resources allocated to a task in the event of higher priority task requirements;

populating, by one or more processors, a resource template using extracted information and selected rules;

generating, by one or more processors, a resource policy using the populated template; and modifying a behavior of the executing simulation and modifying the computer system on which the executing simulation is running by allocating and de-allocating, by one or more processors, resources from the resources pool to the computer system for use in performing the task in the executing simulation based on the generated resource policy.

2. The method of claim 1, wherein the user selection specifies a set of directives comprising one or more each of resource expressions, resource templates and rules used with an instance of the executing simulation.

3. The method of claim 1, wherein executing the resource expression associated with the received user selection to extract information from an executing simulation further comprises:

creating, by one or more processors, a simulation context using the resource expressions to reference attributes of the executing simulation including elapsed simulation time; current statistics of costs, revenues, and failures; and a current task needed by a business process model.

4. The method of claim 1, wherein executing the resource expression associated with the received user selection to extract information from an executing simulation further comprises:

executing, by one or more processors, resource expressions using a resource expression interface to extract information from the executing simulation in the form of parameter values representing real time values for respective parameters.

5. A computer program product for managing configurable resource policies, the computer program product comprising:

a non-transitory computer recordable storage medium containing computer executable program code stored thereon, the computer executable program code comprising:

computer executable program code for receiving a user selection, computer executable program code for executing a resource expression associated with the received user selection to extract information from an executing simulation, wherein the computer executable program code for executing the resource expression associated with the received user selection to extract information from the executing simulation further comprises:

computer executable program code for executing the resource expression to determine a resource requirement at run-time associated with a task to determine respective resource requirements using existing conditions at a current point in the executing simulation, wherein resource requirement parameters determined by the resource expressions include parameters comprising types and identities of the resources required; a quantity in a form of an absolute quantity, a maximum available quantity or a maximum affordable quantity; time constraints specifying a resource availability within a given time interval; and an allocation using one of a static allocation or a dynamic generation of resources, and wherein the resource requirement parameters are specified in an application programming interface (API) call received over a network by a client from a server;

computer executable program code for determining whether there are more user selections to process;

computer executable program code responsive to a determination that there are no more user selections to process, for selecting a set of rules using the user selections and resource expression, wherein computer executable program code for selecting the set of rules using the user selections further comprises:

computer executable program code for selecting, by one or more processors, the set of rules from a group of rules, wherein the group of rules is matched to:

a resource pool;

a re-use strategy, in which re-use of a resource is based on a selected one of a most-recently-used, a most-frequently-used, or a user predefined re-use method;

a cost and quantity defining a selected one of a fixed quantity, a maximum quantity affordable and a maximum quantity available;

an affinity defining how to allocate resources to a group of tasks;

a priority, assigned to tasks for determining which task has precedence in the event of simultaneous requests; and atomicity defining whether to permit preemption of resources allocated to a task in the event of higher priority task requirements;

computer executable program code for populating a resource template using extracted information and selected rules;

computer executable program code for generating a resource policy using the populated template; and computer executable program code for modifying a behavior of the executing simulation and modifying the computer system on which the executing simulation is running by allocating and de-allocating resources from the resources pool to the computer system for use in performing the task in the executing simulation based on the generated policy.

6. The computer program product of claim 5, wherein the user selection specifies a set of directives comprising one or more each of resource expressions, resource templates and rules used with an instance of the executing simulation.

7. The computer program product of claim 5, wherein the computer executable program code for executing the resource expression associated with the received user selection to extract information from the executing simulation further comprises:
   computer executable program code for creating a simulation context using the resource expressions to reference attributes of the executing simulation including elapsed simulation time; current statistics of costs, revenues, and failures; and a current task needed by a business process model.

8. The computer program product of claim 5, wherein the computer executable program code for executing the resource expression associated with the received user selection to extract information from the executing simulation further comprises:
   computer executable program code for executing resource expressions using a resource expression interface to extract information from the executing simulation in the form of parameter values representing real time values for respective parameters.

9. An apparatus for managing configurable resource policies, the apparatus comprising:
   a communications fabric;
   a memory connected to the communications fabric, wherein the memory contains computer executable program code;
   a communications unit connected to the communications fabric;
   an input/output unit connected to the communications fabric;
   a display connected to the communications fabric; and
   a processor unit connected to the communications fabric, wherein the processor unit executes the computer executable program code to direct the apparatus to:
   receive a user selection,
   execute a resource expression associated with the received user selection to extract information from an executing simulation, wherein executing the resource expression determines a resource requirement at runtime associated with a task to determine respective resource requirements using existing conditions at a current point in the executing simulation, wherein resource requirement parameters determined by the resource expressions include parameters comprising types and identities of the resources required; a quantity in a form of an absolute quantity, a maximum available quantity or a maximum affordable quantity; time constraints specifying a resource availability within a given time interval; and an allocation using one of a static allocation or a dynamic generation of resources, and wherein the resource requirement parameters are specified in an application programming interface (API) call received over a network by a client from a server;
   determine whether there are more user selections to process;
   responsive to a determination that there are no more user selections to process, select a set of rules using the user selections and resource expression, wherein the set of rules is selected from a group of rules by matching the group or rules to:
   a resource pool;
   a re-use strategy, in which re-use of a resource is based on a selected one of a most-recently-used, a most-frequently-used, or a user predefined re-use method;
   a cost and quantity defining a selected one of a fixed quantity, a maximum quantity affordable and a maximum quantity available;
   an affinity defining how to allocate resources to a group of tasks;
   a priority, assigned to tasks for determining which task has precedence in the event of simultaneous requests; and
   atomicity defining whether to permit preemption of resources allocated to a task in the event of higher priority task requirements;
   populate a resource template using extracted information and selected rules;
   generate a resource policy using the populated template; and
   modify a behavior of the executing simulation and modify a computer system on which the executing system is running by allocating and de-allocating resources from the resources pool to the computer system for use in performing the task in the executing simulation based on the generated resource policy.

10. The apparatus of claim 9, wherein the processor unit executes the computer executable program code to further direct the apparatus to:
    specify a set of directives in the user selection comprising one or more each of resource expressions, resource templates and rules used with an instance of the executing simulation.

11. The apparatus of claim 9, wherein the processor unit executes the computer executable program code to further direct the apparatus to:
    create a simulation context using the resource expressions to reference attributes of the executing simulation including elapsed simulation time, current statistics of costs, revenues, and failures; and a current task needed by a business process model; and wherein executing resource expressions uses a resource expression interface to extract information from the executing simulation in a form of parameter values representing real time values for respective parameters.

* * * * *